(12) United States Patent
Tong et al.

(10) Patent No.: US 10,691,613 B1
(45) Date of Patent: Jun. 23, 2020

(54) CACHING ALGORITHMS FOR MULTIPLE CACHES

(71) Applicant: EMC IP Holding Company LLC, Hopkinton, MA (US)

(72) Inventors: Hao Tong, Chicago, IL (US); Philip Shilane, Newtown, PA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 33 days.

(21) Appl. No.: 15/418,290

(22) Filed: Jan. 27, 2017

Related U.S. Application Data

(60) Provisional application No. 62/400,448, filed on Sep. 27, 2016.

(51) Int. Cl.
*G06F 12/122* (2016.01)
*G06F 12/0811* (2016.01)
*G06F 12/128* (2016.01)

(52) U.S. Cl.
CPC ........ *G06F 12/122* (2013.01); *G06F 12/0811* (2013.01); *G06F 12/128* (2013.01); *G06F 2212/283* (2013.01)

(58) Field of Classification Search
CPC .. G06F 12/122; G06F 12/0811; G06F 12/128; G06F 12/0806; G06F 12/0808; G06F 12/0893; G06F 12/0895; G06F 12/0897; G06F 12/121; G06F 12/127; G06F 12/123; G06F 12/0888; G06F 2212/283; G06F 2212/22; G06F 2212/221; G06F 2212/222; G06F 2212/3042; G06F 2212/305
See application file for complete search history.

(56) References Cited

U.S. PATENT DOCUMENTS

| | | | | |
|---|---|---|---|---|
| 6,928,526 B1* | 8/2005 | Zhu | ................. | G06F 3/0608 |
| | | | | 711/118 |
| 9,195,672 B1* | 11/2015 | Pang | ................. | G06F 17/30371 |
| 9,201,804 B1* | 12/2015 | Egyed | ................. | G06F 12/0893 |
| 2002/0056025 A1* | 5/2002 | Qiu | ................. | G06F 12/122 |
| | | | | 711/133 |
| 2005/0172076 A1* | 8/2005 | Olson | ................. | G06F 12/0897 |
| | | | | 711/122 |
| 2006/0112233 A1* | 5/2006 | Hu | ................. | G06F 12/0888 |
| | | | | 711/138 |
| 2007/0050552 A1* | 3/2007 | Kim | ................. | G06F 12/0862 |
| | | | | 711/118 |
| 2008/0059707 A1* | 3/2008 | Makineni | ................. | G06F 12/0897 |
| | | | | 711/122 |
| 2008/0256294 A1* | 10/2008 | Gill | ................. | G06F 12/0897 |
| | | | | 711/117 |
| 2008/0282032 A1* | 11/2008 | Shen | ................. | G06F 12/0811 |
| | | | | 711/117 |

(Continued)

OTHER PUBLICATIONS

Li, et al. "Pannier: A container-based FLash Cache for Compound Objects" Dec. 2015, Middleware, pp. 50-62.*

*Primary Examiner* — Michael Krofcheck
(74) *Attorney, Agent, or Firm* — Womble Bond Dickinson (US) LLP

(57) ABSTRACT

One embodiment is related to a method for implementing a cache hierarchy, comprising: implementing a plurality of cache layers in the cache hierarchy; and determining a cache algorithm for each cache layer of the plurality of cache layers.

12 Claims, 6 Drawing Sheets

(56) References Cited

U.S. PATENT DOCUMENTS

| | | | |
|---|---|---|---|
| 2011/0138125 A1* | 6/2011 | Ekanadham | G06F 11/348 711/123 |
| 2015/0032965 A1* | 1/2015 | Sugimoto | G06F 12/0868 711/129 |
| 2015/0149721 A1* | 5/2015 | Kannan | G06F 12/0811 711/122 |
| 2016/0239432 A1* | 8/2016 | Zhuang | G06F 12/12 |

* cited by examiner

CACHING ALGORITHMS FOR MULTIPLE CACHES

CROSS-REFERENCE TO RELATED APPLICATION

This application claims priority from U.S. Provisional Patent Application No. 62/400,448, by Shilane, et al., "Caching Algorithms for Multiple Caches," filed Sep. 27, 2016, which is incorporated by reference for all purposes;

FIELD OF THE INVENTION

Embodiments of the disclosure are related to electronic devices, and more particularly, to a method, apparatus, and system for implementing multiple cache layers.

BACKGROUND

The storage hierarchy continues to evolve, from early use of punch cards to current high-performance flash devices. Though there are numerous media options, the classic storage hierarchy is often described as hard disk drives (HDDs) at the bottom providing slow, persistent storage and dynamic random access memory (DRAM) at the top providing fast, volatile storage. In the 1990s, flash-based solid state devices (SSDs) became available with latency and price between DRAM and HDD, though with limited endurance. As SSD capacity and price continue to improve, SSDs usage is transitioning from primarily a caching layer between DRAM and HDDs to displacing HDDs in certain situations. The new storage media under development present new options for improving the storage hierarchy.

Two main categories of new storage media have been the focus of the investigation due to their maturity and potential impact: non-volatile memory express (NVMe) and non-volatile dual in-line memory modules (NVDIMMs). While flash-based SSDs have become widely used, it has been noted that the current communication protocols impose a large overhead that hides the low latency of flash itself. The NVMe protocol not only reduces communication overheads but also adds deeper queues, more advanced interrupt mechanisms and lock-free parallelism. NVDIMMs offer the potential to have access times close to DRAM, byte level read/writes and persistent state across power outages. Because of the pricing of these products, they are likely to be considered for caches/tiers in the coming years instead of replacing legacy media immediately.

For both NVMe and NVDIMMs, there are numerous options under development in industry. Examples include 3D XPoint NVMe and NVDIMMs announced by Intel and Micron in 2015. Using new hardware, it is claimed that 3D XPoint will have a greatly extended lifespan, several orders of magnitude greater than traditional flash. Hereinafter NVMe with 3D XPoint may be referred to simply as NVMe, though NVMe is more accurately a protocol than a device. NVMe products are coming to market, while NVDIMM products are in an earlier stage of development.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
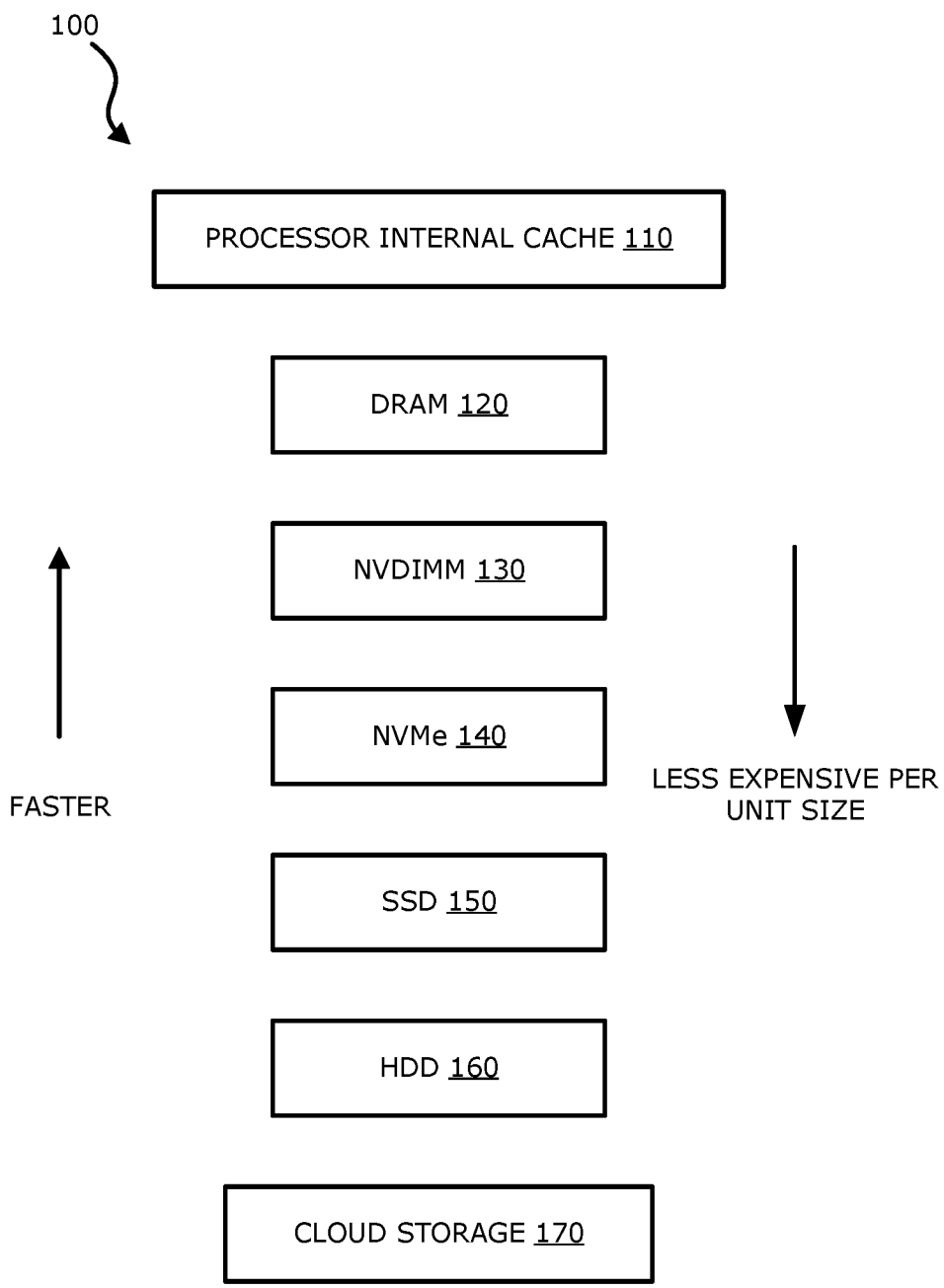
FIG. 1 is a block diagram illustrating an example storage hierarchy according to one embodiment of the disclosure.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure are related to methods, apparatuses, and systems for incorporating new media as a cache within the storage hierarchy. Caching across a larger number of layers (e.g., >2) is now motivated by new media options. The performance of a data storage system with multiple layers of caches (not including processor cache) may be affected by multiple factors, such as: 1) the algorithm adopted by each layer, 2) the interaction between layers, 3) the size of each layer, and 4) the media type for each layer. It should be appreciated that the design choices for cache layers may be constricted by budget limits.

TABLE 1

Media Properties. Lifespan is measured in how many times the full capacity can be written.

|  | DRAM | NVDIMM | NVMe | SSD | HDD |
| --- | --- | --- | --- | --- | --- |
| Volatile | Yes | No | No | No | No |
| Access Unit | Byte | Byte | Block | Block | Block |
| Latency | 80 ns | 500 ns | 7 μs | 40 μs | 7 ms |
| IOPS | 1500k | 900k | 540k | 100k | 100 |
| Lifespan | Infinite | 1M-10M | 10k-1M | 1k-10k | Infinite |
| Cost per GB | $7.0 | $4.0 | $1.5 | $0.3 | $0.05 |

Storage media have several properties that need to be taken into consideration. Table 1 above shows representative values, though there are many unknowns about both NVMe and NVDIMM products under development. Moving from left to right in the table, latency increases, Input/output Operations Per Second (IOPS) decrease (dramatically for HDD) and cost decreases, which makes these new media (e.g., NVMe, NVDIMM) excellent candidates for caching purposes that put smaller, faster devices towards the top of a storage hierarchy to accelerate performance.

Lifespan follows a less regular pattern with unlimited writes for DRAM and HDD and thousands of writes for SSD. NVDIMMs may support millions of writes, which is larger than practical uses. NVMe has a much larger lifespan range depending on whether the media is traditional flash or the newer 3D XPoint option. For media with a limited number of writes, caching algorithms must manage writes to meet the overall system lifespan requirements.

Referring to FIG. 1, a block diagram illustrating an example storage hierarchy 100 according to one embodiment of the disclosure is shown. The example storage hierarchy 100 comprises seven layers, which are, from top to bottom, internal cache on a processor 110, DRAM 120, NVDIMM 130, NVMe 140, SSD 150, HDD 160, and cloud storage 170. It should be appreciated that FIG. 1 is illustrative only and storage hierarchies according to embodiments of the disclosure may comprise additional layers not illustrated in FIG. 1 or fewer layers than illustrated in FIG. 1. Generally speaking, layers toward the top may be faster but more expensive per unit of storage and therefore smaller in size, while layers toward the bottom may be slower but less expensive per unit of storage and therefore larger in size. Hereinafter the term "cache hierarchy" may not comprise the processor internal cache.

According to one embodiment of the disclosure, a caching technique named Multi-Cache may be utilized to implement various multi-cache storage configurations. Multi-Cache may support multiple cache layers and has a modular caching structure that can be extended.

Multi-Cache provides a BaseCache module with generic cache operations including: get, insert and evict. ByteCache and ContainerCache are implementations of BaseCache that provide templates for byte- and block-addressable algorithms, respectively. Caching algorithms are built upon these basic components. ByteCache may support First In First Out (FIFO), Least Recently Used (LRU), Segmented LRU, Least Frequently Used (LFU), Greedy Dual-Size Frequency (GDSF), Multi-Queue (MQ), Low Inter-reference Recency Set (LIRS), and Adaptive Replacement Cache (ARC). ContainerCache may support ContainerLRU, Pannier, and multiple traditional algorithms updated for containers.

Figure 2:
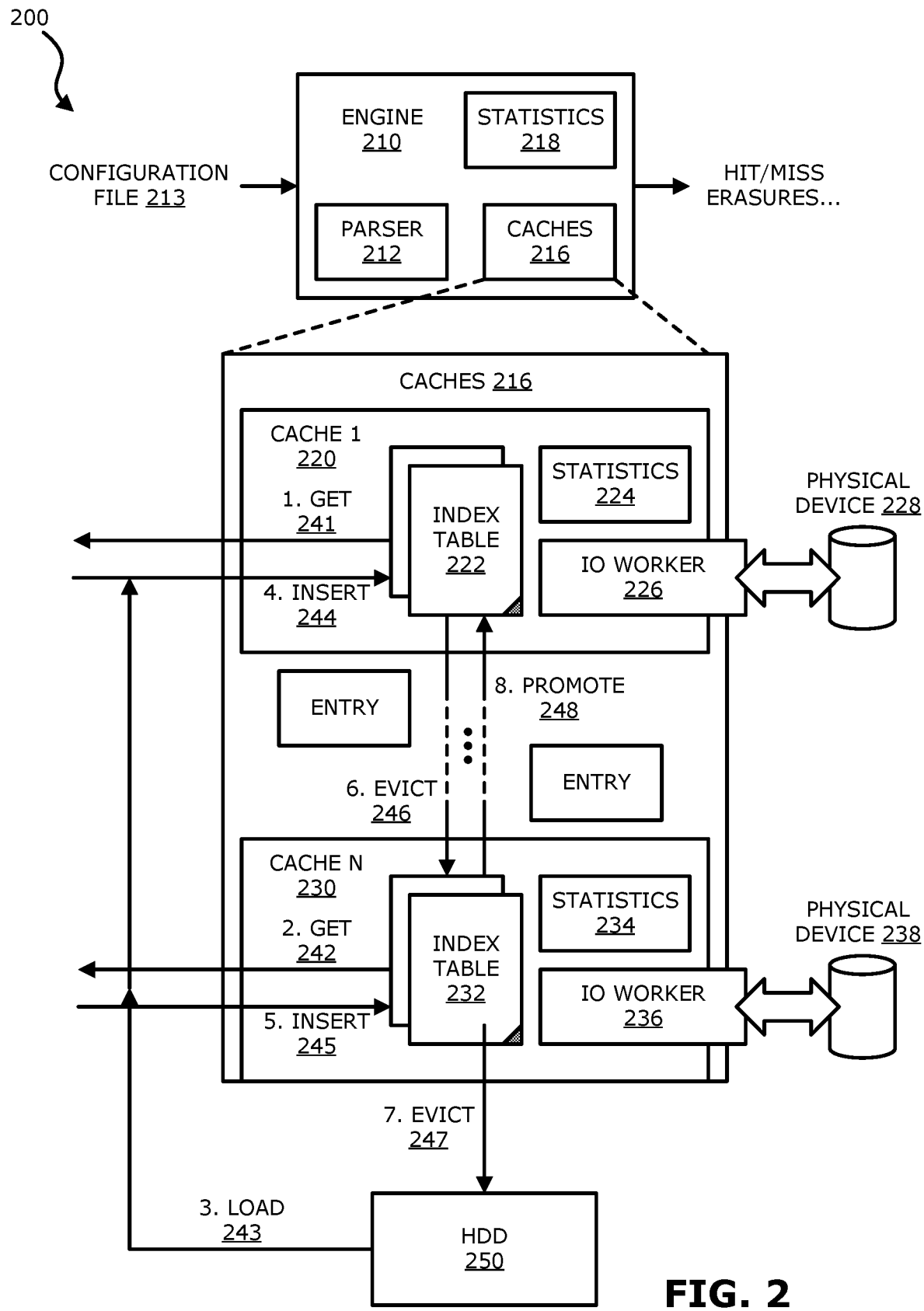
FIG. 2 is a diagram illustrating an example architecture of Multi-Cache.

Referring to FIG. 2, a diagram illustrating an example architecture 200 of Multi-Cache is shown. FIG. 2 shows the architecture of Multi-Cache with multiple cache layers. The Engine 210 at the top consists of three main components. First, the parser 212 uses the configuration file 213 to create the caches 216 and then reads the I/O trace file 214 and issues cache commands. Second, the cache 216 itself consists of multiple caching layers 220, 230 and provides the bulk of the functionality. Third, statistics 218 are gathered such as hits, latency, erasures, etc.

Expanding on the cache component 216, multiple cache layers 220, 230 can be combined, though for simplicity FIG. 2 only shows two layers 220, 230. Each layer 220, 230 has its own cache algorithm, in-memory index table 222, 232, statistics 224, 234 and an optional I/O Worker 226, 236 that can access physical devices 228, 238.

In the write path, writes are inserted to the cache 220, 230 and a previous version (if it exists) is invalidated and then removed in an asynchronous process. The read path has more steps, which are described below.

Hit: When there is a read, it will first check Cache 1 (get 241). On a hit, the status is returned. Miss then Hit: If the read is a miss in Cache 1 220, it will then check the next lower layer (get 242). If it is a hit, the status is returned. Miss and Load: If the read misses in all layers, the miss will be recorded, and data will be loaded from the lowest layer (load 243), which is an HDD 250 by default, but could be another media. Depending on the configuration, the new entry may be inserted into Cache 1 220 (insert 244) or Cache n 230 (insert 245).

Evict: When a cache 220, 230 is full (or becomes fuller than a threshold), eviction will be trigger according to the algorithm. An evicted entry from Cache 1 220 will be inserted into a lower layer (evict 246), which can trigger further eviction from Cache N 230 (evict 247). Promotion: If an entry in lower layers is read multiple times, promoting it to an upper cache layer can decrease the latency for future accesses. The promotion step (promote 248) moves the entry into an upper layer, which may trigger evictions.

While processing inputs/outputs (I/Os), the cache engine 210 records numerous statistics 218 about cache operations for each cache 220, 230 as well as across all caches 216.

Most existing caching algorithms are developed for a single or at most two cache layers; therefore, adaptations may be required for more complex caching situations. A globally cooperative cache model based on simple interactions may be utilized.

Figure 3:
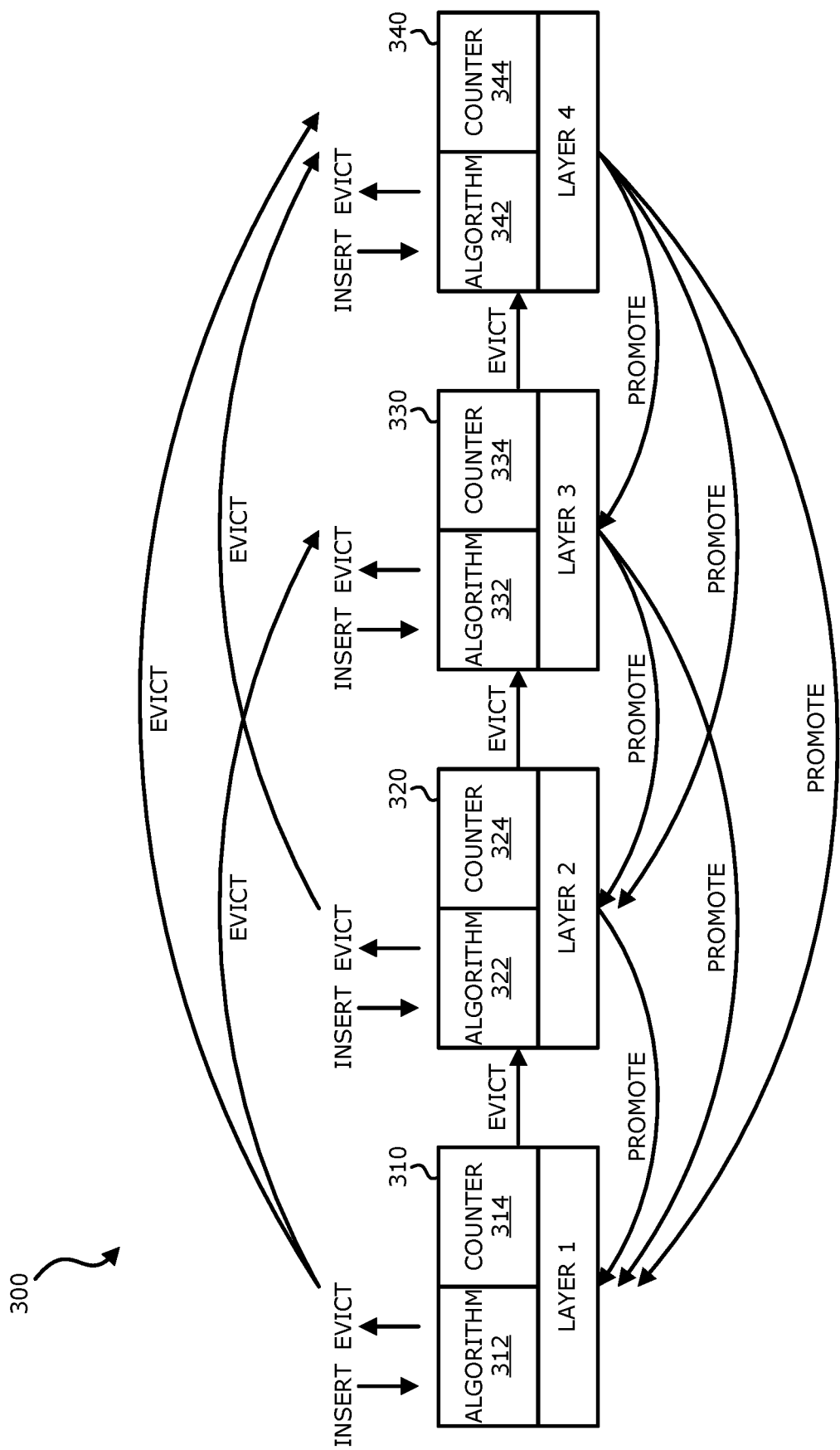
FIG. 3 is a diagram illustrating an example cache structure.

Referring to FIG. 3, a diagram illustrating an example cache structure 300 is shown. FIG. 3 shows four layers of cache: Layer 1 310, Layer 2 320, Layer 3 330, and Layer 4 340. It should be appreciated that FIG. 3 is illustrative only and a cache structure according to embodiments of the disclosure may comprise more or fewer layers than shown in FIG. 3. In one embodiment, layers toward left may be faster and smaller, while layers toward right may be slower and larger. For example, in one embodiment, Layers 1 through 4 310, 320, 330, 340 may be a DRAM layer, an NVDIMM layer, an NVMe layer, and an SSD layer, respectively. For each cache layer 310, 320, 330, 340, the movement of entries is controlled by both the caching algorithm 312, 322, 332, 342 and access counters 314, 324, 334, 344. Within a cache layer, the algorithm utilized controls movement within internal queues and whether to evict an entry. This creates a data flow from left to write as entries are evicted.

Movement in the opposite direction may be referred to as promotion. A promotion technique based on access counters may be utilized. When an entry's access count reaches a preconfigured threshold value for that layer, the entry is promoted. It should be noted that the access count for an entry is cleared when it is promoted. Promotion may trigger an eviction from the upper layer, but there are no cycles.

In one embodiment, an entry may be promoted beyond one cache layer, and/or may be evicted to a cache layer that is more than one layer lower in the cache hierarchy. For example, an entry in Layer 4 340 may be promoted directly to Layer 2 320 or even Layer 1 310, and an entry in Layer 1 310 may be evicted directly to Layer 3 330 or even Layer 4 340. In one embodiment, an entry in any cache layer may be evicted out of the cache hierarchy altogether. It should be appreciated that when an entry is evicted out of the cache hierarchy, whether a copy of the entry exists on a persistent storage (e.g., HDD or cloud storage) needs to be determined. If a copy does not exist on a persistent storage (i.e., a dirty entry), one needs to be created before the eviction so that the eviction does not cause data loss.

In one embodiment, a feature known as Ghost Cache may be implemented in a cache hierarchy, preferably in a cache layer that is fast to access, such as Layer 1 310 of FIG. 3.

Figure 4:
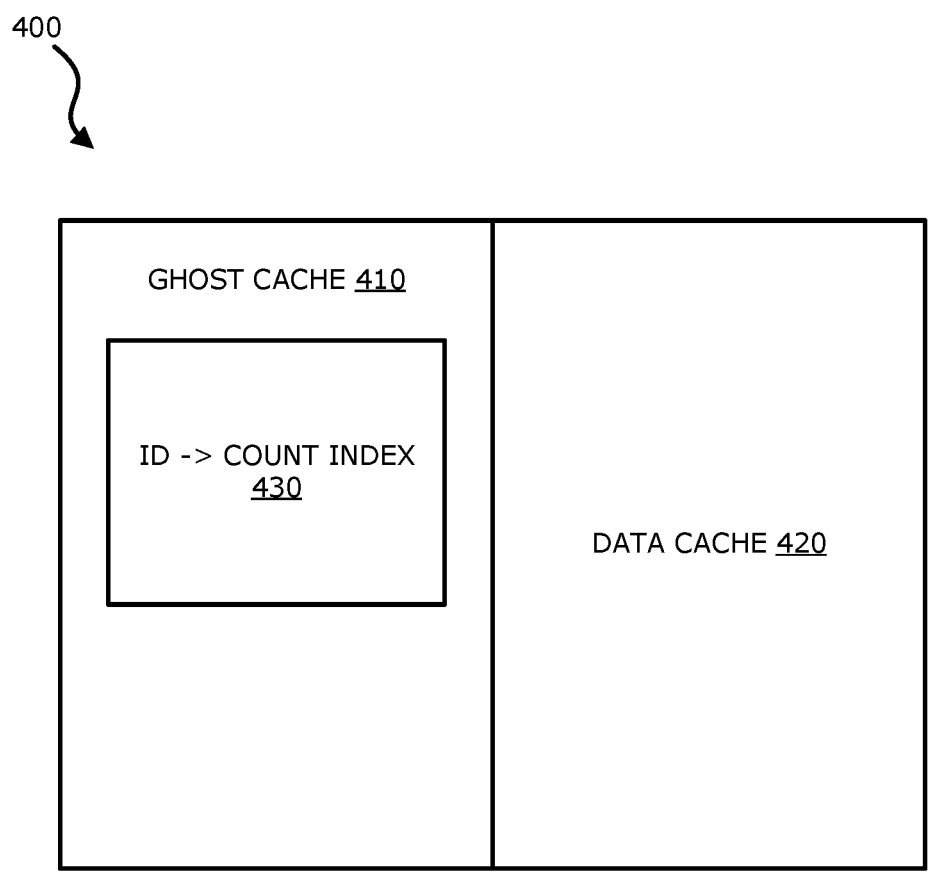
FIG. 4 is a block diagram illustrating an example Ghost Cache implementation.

Referring to FIG. 4, a block diagram illustrating an example Ghost Cache implementation 400 is shown. The Ghost Cache 410 resides alongside actual data cache 420 in the cache layer in which it is implemented. The Ghost Cache 410 may comprise an index 430 that records a cache hit count associated with each entry that has resided in the cache hierarchy. An entry may be identified by an identifier (ID). In one embodiment, the identifier may be a hash of the entry. In another embodiment, the identifier may be the logical block address (LBA) of the data. The Ghost Cache 410 may comprise hit counts associated with a subset of the entries that have ever existed in the cache hierarchy. The main use of the Ghost Cache 410 is to track hit counts for entries even when there is insufficient space to maintain the data associated with the entry in the cache. In some embodiments, the Ghost Cache entry may be as small as 6 bytes, 4 bytes for the ID and 2 bytes for a counter, whereas the data associated with an entry may be kilobytes to terabytes in size. The cache hit count may be an aged count that biases toward more recent cache hits.

Figure 5:
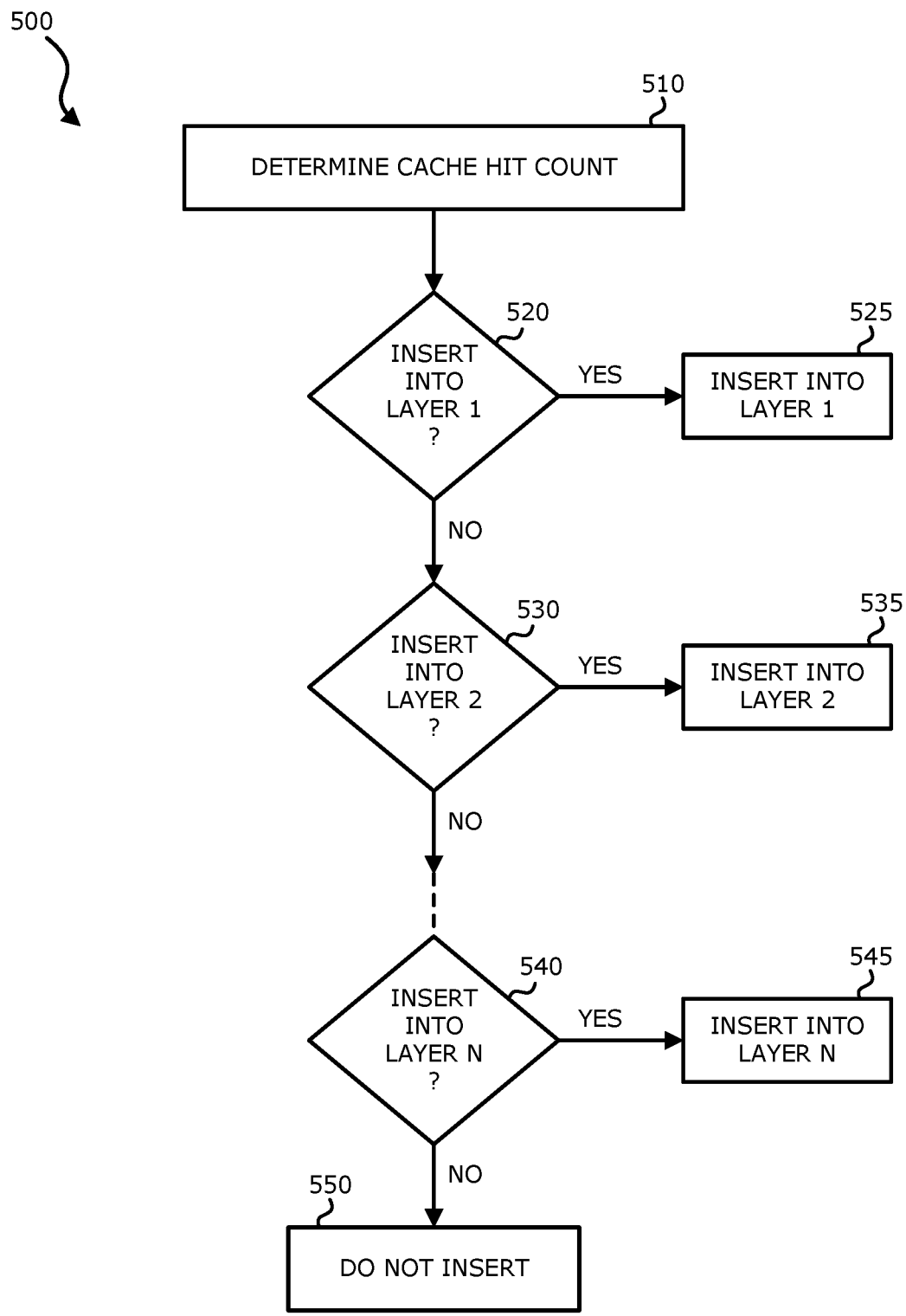
FIG. 5 is a flowchart illustrating an example method for inserting an entry into a cache hierarchy.

Referring to FIG. 5, a flowchart illustrating an example method 500 for inserting an entry into a cache hierarchy is shown. At block 510, a cache hit count of the entry may be determined using the index of the Ghost Cache 410. Each cache layer may be associated with a cache hit count threshold for insertion into the layer. Faster layers (e.g., layers toward the top) may be associated with higher thresholds. Therefore, at block 520, it may be determined whether the entry is to be inserted into Layer 1 (e.g., the fastest cache layer) based on the cache hit count of the entry and the cache hit count threshold associated with Layer 1. If it is determined that the entry is to be inserted into Layer 1 (e.g., when the cache hit count for the entry is greater than the threshold associated with Layer 1), the entry may be inserted into Layer 1 at block 525. If it is determined that the entry is not to be inserted into Layer 1 (e.g., when the cache hit count for the entry is not greater than the threshold associated with Layer 1), whether the entry is to be inserted into lower cache tiers may be determined in a similar fashion at blocks 530, 540, etc. If it is determined at block 530 that the entry is to be inserted into Layer 2, the entry is inserted into Layer 2 at block 535. Similarly, if it is determined at block 540 that the entry is to be inserted into Layer N, the entry is inserted into Layer N at block 545. If it is determined at block 540 that the entry is not to be inserted into Layer N (e.g., the slowest cache layer) because e.g., the cache hit count of the entry is not greater than the threshold associated with Layer N, at block 550, the entry is not inserted into the cache hierarchy at all and remains stored in a slow persistent storage (e.g., HDD or cloud storage) only.

The cache hit count-based insertion policy described above may be similarly adapted for data entry promotion and eviction.

Two algorithms named Global LRU and MC-Mixed (MultiCache-Mixed), respectively, may be utilized with the multi-cache architecture in accordance with embodiments of the disclosure.

Global LRU is similar to the segmented LRU algorithm for a single cache. Each cache layer may be treated as its own segment for LRU purposes, and an entry may be promoted to an upper layer based on an access (e.g., cache hit) threshold. A straightforward LRU algorithm, though, is unaware of flash properties and can experience excessive writes and erasures, degrading flash lifespan. For that reason, LRU may be used as the per-cache algorithm for DRAM and NVDIMM, while container LRU may be used for NVMe and SSD to reduce erasures. Container LRU groups entries into multi-megabyte containers aligned with the flash erasure size, and evicts the container with the oldest access time. The promotion thresholds may be one for simplicity, which causes entries across all layers to be ordered, or may be other values.

MC-Mixed uses algorithms optimized for a given layer's media. Each layer has its own priority queue(s) specified by its algorithm and the best promotion policy suitable for the layer. In one embodiment, ARC is used for DRAM and NVDIMM, while Pannier is used for NVMe and SSD. These algorithms are shown to have better cache hit ratios than other techniques while also extending the lifespan of NVMe and SSD, which have limited erasures.

More modern, advanced caching algorithms may outperform simpler caching algorithms. Replacing LRU (L) with 2 segment LRU (S2LRU) and then ARC in DRAM and NVDIMM caches may improve the hit ratio and read latency. Using S2LRU in a layer directly below a layer that uses ARC may need to be avoided because there may be a conflict that evictions from ARC to the S2LRU layer may keep an entry in the cache for an unnecessarily long time. Read hit ratio and latency may not exactly mirror each other because hits at different cache layers may have different latencies.

Using more advanced caching algorithms (e.g., Pannier) in the NVMe and SSD layers may have less impact on read hit ratio and latency, but it may decrease the erasures in both layers since Pannier was specifically designed to reduce erasures. When upper layers adopt better algorithms, erasures may decrease in lower layers.

Overall MC-Mixed may achieve among the highest read hit ratios, lowest latency and the lowest erasures.

Different promotion policies between layers may also have an impact on performance. In general, when the hit count for an entry reaches a threshold, the entry is promoted. The thresholds and whether the promotion is to the next layer or to the top may be varied in different policies.

Six promotion policies contemplated are:

simple: When an entry is hit, promote one layer up.

decr: Thresholds from top to bottom are in decreasing order (6, 4 and 2), which means it becomes progressively harder for data to move up layers.

incr: Thresholds from top to bottom are in increasing order (2, 4 and 6), which means it becomes progressively easier to move up layers.

eq: Thresholds for all layers are equal (2, 2, and 2).

simple-top: Similar to simple, but an entry is promoted directly to the top layer.

none: No promotion.

For Global LRU, simple may have the highest read hit ratio and lowest SSD erasures, and eq may have the lowest latency and among the lowest erasures. Valuing low latency and lifespan, eq likely has the best overall results for Global LRU suggesting a simple policy of promoting one level up on a few hits may be effective.

Promotion may interact poorly with using ARC in upper cache layers and Pannier in lower cache layers. Such algorithm combinations may have better results with the none policy because using ARC at the upper layers already is effective at caching important data and promotion policies may bring in data unlikely to be reused again. In summary, promotion may benefit a simple caching policy (e.g., an algorithm combination comprising LRU and Container LRU), but a more advanced policy (e.g., an algorithm combination comprising ARC and Pannier) may be harmed by promotion options.

Increasing the cache size may increase the read hit ratio, decrease latency, and reduce erasures. Increasing the cache size at upper layers (e.g., larger NVDIMM) may decrease latency more than increasing the cache at lower layers (e.g., larger SSD) and may reduce erasures. There may be greater value in growing caches at the upper layers than lower layers even though the sizing differences are an order of magnitude greater at the lower layers.

Holding the initial budget constant, using more flash (e.g., not using DRAM or NVDIMM) may result in a higher flash maintenance cost (The flash maintenance cost "FMC" represents unit time cost of a flash device during its lifetime, which can be thought of as the cost per day for using the flash cache, since it is a limited resource. FMC may be defined as fmc=size×price×erasures_per_day/lifespan). On the other hand, not using any flash may result in better IOPS/$ though latency and hit ratios may be negatively affected because the overall cache size may be relatively small due to the cost of DRAM and NVDIMM.

Method 500 may be performed by processing logic that includes hardware (e.g. circuitry, dedicated logic, etc.), software (e.g., embodied on a non-transitory computer readable medium), or a combination thereof. For example, method 500 may be performed by processors 1501 of FIG. 6. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, embodiments of the disclosure are related to a cache hierarchy comprising a plurality (e.g., >2) of cache layers. Different combinations of cache layer sizes and media may be used in the cache hierarchy, and different cache algorithms and promotion/eviction policies may be used at different cache layers. Such a cache hierarchy may have better performance than a single cache that costs the same.

According to embodiments of the disclosure, a plurality of cache layers may be implemented in a cache hierarchy, and a cache algorithm may be chosen/determined for each cache layer of the plurality of cache layers. Each of the cache layers may be implemented with one of: dynamic random access memory (DRAM), non-volatile dual in-line memory module (NVDIMM), non-volatile memory express (NVMe), or solid state drive (SSD). Further, the cache algorithm for each cache layer may be one of: Least Recently Used (LRU), Adaptive Replacement Cache (ARC), Container-aware LRU (CLRU), or Pannier. In particular, due to limited endurance and lifespan of NVMe and SSD, the cache algorithm for an NVMe cache layer or an SSD cache layer may be chosen between CLRU and Pannier, because CLRU and Pannier are optimized for media with limited endurance and lifespan.

From the highest cache layer to the lowest cache layer in the cache hierarchy, the respective access latency associated with each layer may increase monotonically. A data entry may be promoted from a cache layer with a longer access latency (i.e., a lower layer) to a cache layer with a shorter access latency (i.e., a higher layer), and may be evicted in the opposite direction. The promotion of a data entry may be based on a cache hit count associated with the data entry and a cache hit count threshold associated with the layer to which the data entry is to be promoted (e.g., if the cache hit count of a data entry is above a threshold associated with a particular higher layer, the data entry may be promoted to that layer). The promotion may be to the next higher layer, or to two or more layers above, or directly to the top layer. From a highest cache layer to a lowest cache layer, the respective cache hit count threshold associated with each layer may decrease monotonically. The eviction of a data entry may be based on a cache hit count associated with the data entry, a cache hit count threshold associated with the layer where the data entry currently resides, and a cache hit count threshold associated with the layer to which the data entry is to be evicted (e.g., if the cache hit count of a data entry is not above the threshold associated with the current layer but is above a threshold associated with a particular lower layer, the data entry may be evicted to that layer). If the cache hit count of a data entry is not above the threshold associated with the lowest cache layer, the data entry may be evicted from the cache hierarchy altogether.

The cache hit counts associated with data entries may be stored in an index (e.g., the Ghost Cache 410) that resides in a cache layer with a relatively short access latency. The index may comprise cache hit counts associated with data entries that do not currently exist in the cache hierarchy, due to the limited total space of the cache hierarchy.

Figure 6:
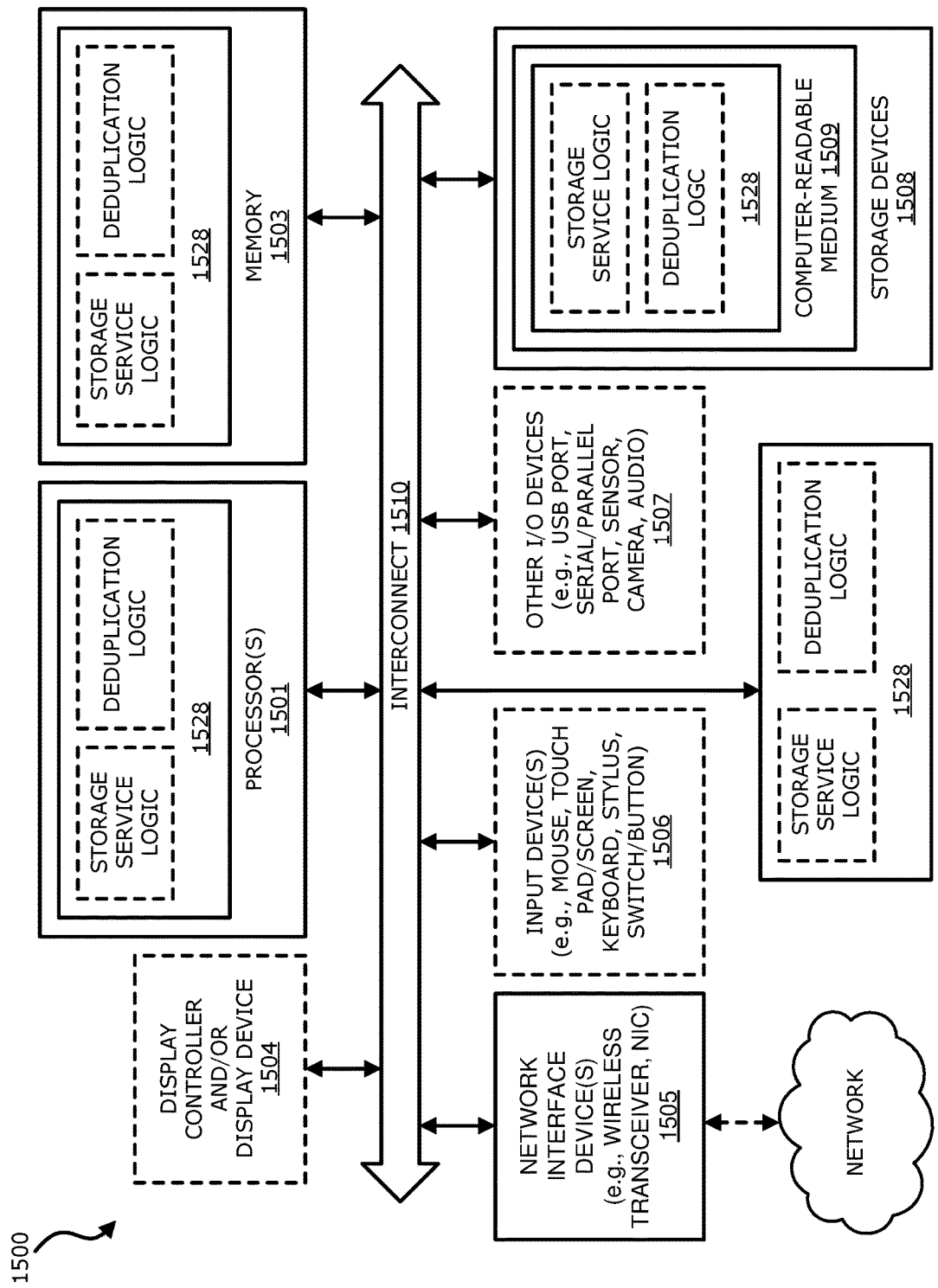
FIG. 6 is a block diagram illustrating an example of a data processing system which may be used with one embodiment of the disclosure.

FIG. 6 is a block diagram illustrating an example of a data processing system 1500 which may be used with one embodiment of the disclosure. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for implementing a cache hierarchy, comprising:

implementing three or more cache layers in the cache hierarchy, wherein at least one of the three or more cache layers is implemented with either non-volatile memory express (NVMe) or solid state drive (SSD);

determining a cache algorithm for each cache layer of the three or more cache layers, wherein Container-aware LRU (CLRU) or Pannier cache algorithm is utilized at any of the three or more cache layers that is implemented with either NVMe or SSD to reduce erasures, wherein each remaining layer of the three or more cache layers is implemented with one of: dynamic random access memory (DRAM), non-volatile dual in-line memory module (NVDIMM), NVMe, or SSD, wherein the cache algorithm for each remaining cache layer is one of: Least Recently Used (LRU), Adaptive Replacement Cache (ARC), CLRU, or Pannier, wherein a first data entry is promoted from a first cache layer of the three or more cache layers to a second cache layer of the three or more cache layers, wherein the second cache layer is two or more layers above the first cache layer in the cache hierarchy, and wherein the second cache layer has a shorter access latency than the first cache layer; and maintaining an index in the cache hierarchy recording a hit count associated with each data entry that has ever resided in the cache hierarchy, wherein a third bit count associated with a third data entry is kept updated after the third data entry is evicted from the cache hierarchy, and in response to the updated third hit count being above a cache hit count threshold associated with at least one of the cache layers, the third data entry is re-inserted into the cache hierarchy at a particular cache layer based at least in part on the updated third hit count.

2. The method of claim 1, wherein the promotion of the first data entry is based on a first cache hit count associated with the first data entry and a cache hit count threshold associated with the second cache layer.

3. The method of claim 1, wherein each cache layer is associated with its respective access latency and cache hit count threshold.

4. The method of claim 3, wherein from a highest cache layer to a lowest cache layer in the cache hierarchy, the respective access latency associated with each layer increases monotonically, and the respective cache hit count threshold associated with each layer decreases monotonically.

5. The method of claim 2, wherein the first cache hit count associated with the first data entry is stored in the index that resides in the second cache layer.

6. The method of claim 5, wherein the index comprises a second cache hit count associated with a second data entry, the second data entry not being stored in the cache hierarchy.

7. The method of claim 2, wherein the first cache hit count associated with the first data entry is stored in the index that resides in a third cache layer, wherein the third cache layer has a shorter access latency than the second cache layer.

8. The method of claim 1, wherein a data entry is evicted from the second cache layer of the three or more cache layers to the first cache layer of the three or more cache layers, wherein the first cache layer has a longer access latency than the second cache layer.

9. The method of claim 8, wherein a cache hit count associated with the data entry is above a cache hit count threshold associated with the first cache layer.

10. The method of claim 1, wherein a data entry is evicted from the cache hierarchy in response to determining that a cache hit count associated with the data entry is not above a cache hit count threshold associated with a lowest cache layer in the cache hierarchy.

11. A data processing system, comprising:
three or more cache layers in a cache hierarchy, wherein at least one of the three or more cache layers is implemented with either non-volatile memory express (NVMe) or solid state drive (SSD);
a processor; and
a memory coupled to the processor storing instructions which, when executed by the processor, cause the processor to perform caching operations, the operations including:
determining a cache algorithm for each cache layer of the three or more cache layers, wherein Container-aware LRU (CLRU) or Pannier cache algorithm is utilized at any of the three or more cache layers that is implemented with either NVMe or SSD to reduce erasures, wherein each remaining layer of the three or more cache layers is implemented with one of: dynamic random access memory (DRAM), non-volatile dual in-line memory module (NVDIMM), NVMe, or SSD, wherein the cache algorithm for each remaining cache layer is one of: Least Recently Used (LRU), Adaptive Replacement Cache (ARC), CLRU, or Pannier, wherein a first data entry is promoted from a first cache layer of the three or more cache layers to a second cache layer of the three or more cache layers, wherein the second cache layer is two or more layers above the first cache layer in the cache hierarchy, and wherein the second cache layer has a shorter access latency than the first cache layer; and
maintaining an index in the cache hierarchy recording a hit count associated with each data entry that has ever resided in the cache hierarchy, wherein a third bit count associated with a third data entry is kept updated after the third data entry is evicted from the cache hierarchy, and in response to the updated third hit count being above a cache hit count threshold associated with at least one of the cache layers, the third data entry is re-inserted into the cache hierarchy at a particular cache layer based at least in part on the updated third hit count.

12. A non-transitory machine-readable medium having instructions stored therein which, when executed by a processor, cause the processor to perform caching operations, the operations comprising:
implementing three or more cache layers in a cache hierarchy, wherein at least one of the three or more cache layers is implemented with either non-volatile memory express (NVMe) or solid state drive (SSD);
determining a cache algorithm for each cache layer of the three or more cache layers, wherein Container-aware LRU (CLRU) or Pannier cache algorithm is utilized at any of the three or more cache layers that is implemented with either NVMe or SSD to reduce erasures, wherein each remaining layer of the three or more cache layers is implemented with one of: dynamic random access memory (DRAM), non-volatile dual in-line memory module (NVDIMM), NVMe, or SSD, wherein the cache algorithm for each remaining cache layer is one of: Least Recently Used (LRU), Adaptive Replacement Cache (ARC), CLRU, or Pannier, wherein a first data entry is promoted from a first cache layer of the three or more cache layers to a second cache layer of the three or more cache layers, wherein the second cache layer is two or more layers above the first cache layer in the cache hierarchy, and wherein the second cache layer has a shorter access latency than the first cache layer; and
maintaining an index in the cache hierarchy recording a hit count associated with each data entry that has ever resided in the cache hierarchy, wherein a third bit count associated with a third data entry is kept updated after the third data entry is evicted from the cache hierarchy, and in response to the updated third hit count being above a cache hit count threshold associated with at least one of the cache layers, the third data entry is re-inserted into the cache hierarchy at a particular cache layer based at least in part on the updated third hit count.

* * * * *